US012091091B2

(12) United States Patent
Moradnia et al.

(10) Patent No.: US 12,091,091 B2
(45) Date of Patent: Sep. 17, 2024

(54) DISK INNER FENDER UNDERCOVER

(71) Applicant: Honda Motor Co., Ltd., Tokyo (JP)

(72) Inventors: Pirooz Moradnia, Dublin, OH (US); Matthew L Metka, Plain City, OH (US); Benjamin Bowlby, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 17/706,885

(22) Filed: Mar. 29, 2022

(65) Prior Publication Data

US 2023/0312014 A1   Oct. 5, 2023

(51) Int. Cl.
*B62D 25/16* (2006.01)
*B60T 5/00* (2006.01)
*B62D 25/18* (2006.01)

(52) U.S. Cl.
CPC .............. *B62D 25/186* (2013.01); *B60T 5/00* (2013.01); *B62D 25/163* (2013.01)

(58) Field of Classification Search
CPC .... B62D 25/186; B62D 25/163; B62D 35/02; B60T 5/00
See application file for complete search history.

(56) References Cited

U.S. PATENT DOCUMENTS

| | | | |
|---|---|---|---|
| 1,613,443 A * | 1/1927 | Amato | B62D 25/186 280/157 |
| 4,317,508 A * | 3/1982 | Katagiri | F16D 55/22 188/71.6 |
| 4,503,944 A | 3/1985 | Burckhardt et al. | |
| 5,951,123 A * | 9/1999 | Bomstad | E02D 3/026 172/112 |
| 6,109,621 A * | 8/2000 | Hettich | B62D 25/186 280/157 |
| 6,318,809 B1 | 11/2001 | Bennett | |
| 6,796,406 B1 | 9/2004 | Yunes | |
| 7,975,789 B2 | 7/2011 | Murata | |
| 8,882,121 B2 * | 11/2014 | Ducroquet | B62D 25/168 280/157 |
| 9,227,475 B2 * | 1/2016 | Ottinger | B62D 29/004 |
| 9,239,087 B2 * | 1/2016 | Frantz | F16D 65/0081 |

(Continued)

FOREIGN PATENT DOCUMENTS

| | | |
|---|---|---|
| CN | 110966324 A | 4/2020 |
| DE | 10336798 A1 | 3/2005 |

(Continued)

*Primary Examiner* — Steve Clemmons
(74) *Attorney, Agent, or Firm* — Plumsea Law Group, LLC

(57) ABSTRACT

A vehicle includes a vehicle body having an underbody, the vehicle body defining an inner fender, the inner fender forming an opening in the underbody of the vehicle body. A wheel assembly has a rim and a tire, and the wheel assembly is positioned within the inner fender. A suspension knuckle is disposed within the inner fender to permit motion of the wheel assembly relative to the vehicle body. A brake shield is mounted on the suspension knuckle and an inner fender undercover panel is secured on one of the brake shield and the suspension knuckle and disposed inboard of the wheel assembly. The inner fender undercover panel is configured to move up and down with vertical movement of the suspension knuckle and to move with turning movement of the wheel assembly.

18 Claims, 7 Drawing Sheets

(56) References Cited

U.S. PATENT DOCUMENTS

| | | | |
|---|---|---|---|
| 9,637,176 B2 * | 5/2017 | Heino | B62D 25/186 |
| 9,643,664 B2 * | 5/2017 | Tesch | B62D 35/02 |
| 10,458,496 B2 | 10/2019 | Grabiec et al. | |
| 10,654,531 B2 | 5/2020 | Del Gaizo et al. | |
| 10,654,532 B2 * | 5/2020 | Nakamura | B62D 35/02 |
| 10,787,205 B2 * | 9/2020 | Driant | B62D 25/16 |
| 10,787,208 B2 * | 9/2020 | Nishida | B60G 7/001 |
| 10,895,298 B2 | 1/2021 | Pavesio et al. | |
| 11,072,313 B2 * | 7/2021 | Schuemann | B62D 35/02 |
| 2006/0011424 A1 | 1/2006 | Goodell et al. | |
| 2007/0182151 A1 * | 8/2007 | Aulabaugh | B62D 25/161 |
| | | | 280/849 |
| 2011/0080019 A1 | 4/2011 | Castillo | |
| 2016/0084328 A1 | 3/2016 | Elliot | |
| 2018/0162460 A1 * | 6/2018 | Seidler | B62D 35/02 |
| 2020/0102992 A1 | 4/2020 | Miyake et al. | |
| 2020/0114982 A1 | 4/2020 | Parry-Williams et al. | |
| 2020/0116221 A1 | 4/2020 | Ogawa et al. | |
| 2021/0078652 A1 * | 3/2021 | Bösl | B60G 7/001 |
| 2022/0154789 A1 * | 5/2022 | Karich | F16D 55/22 |

FOREIGN PATENT DOCUMENTS

| | | | | |
|---|---|---|---|---|
| DE | 102004054112 A1 | | 7/2005 | |
| DE | 102015204527 A1 | | 9/2016 | |
| DE | 202017102035 U1 | | 6/2017 | |
| EP | 3018379 B1 | | 11/2018 | |
| FR | 2950598 A1 | * | 4/2011 | B62D 25/186 |
| JP | 2016120854 A | * | 7/2016 | |
| JP | 6245125 B2 | | 12/2017 | |
| WO | 2014087070 A1 | | 6/2014 | |
| WO | 2015074800 A2 | | 5/2015 | |

\* cited by examiner

DISK INNER FENDER UNDERCOVER

BACKGROUND

1. Field of the Disclosure

The present disclosure relates to an inner fender undercover for a vehicle and, more particularly, a disk-shaped inner fender undercover configured for movement with a wheel assembly of the vehicle.

2. Description of Related Art

Generally speaking, the panels mounted inside the front and rear fenders of a vehicle are known as inner fenders or inner fender panels. The inner fenders define the top and inboard side of a large open space, or wheelhouse area, that is sized to accommodate the suspension components necessary to allow the wheel assembly to move and turn within a predetermined wheel envelope. This relatively large open space, however, creates a strong interaction between the airflow along the underbody of the vehicle and various suspension components disposed within the wheelhouse area. As a result, this airflow interaction increases aerodynamic drag and exposes the suspension components within the wheelhouse area to damage from mud, rocks, gravel, snow, corrosive environments, and the like, as encountered when the vehicle is being driven.

There is a need in the art for a system and method that can protect the suspension components within the wheelhouse area while also not impeding the movement of the wheel assembly.

SUMMARY OF THE INVENTION

To overcome this problem, an inner fender undercover is positioned inboard of the wheel and is configured to turn in order to accommodate wheel turning movement and to move vertically in order to accommodate vertical movement of the suspension arm, while at the same time protecting the suspension components and improving the aerodynamics of the vehicle.

In one aspect, the disclosure provides a vehicle comprising a vehicle body having an underbody, the vehicle body defining an inner fender, the inner fender forming an opening in the underbody of the vehicle body; a wheel assembly having a rim and a tire, the wheel assembly being positioned within the inner fender; a suspension knuckle disposed within the inner fender to permit motion of the wheel assembly relative to the vehicle body; a brake shield mounted on the suspension knuckle; and an inner fender undercover panel secured on one of the brake shield and the suspension knuckle and disposed inboard of the wheel. The inner fender undercover is configured to move up and down with vertical movement of the suspension knuckle and to move with turning movement of the wheel assembly.

A further aspect of the disclosure provides a suspension assembly for a vehicle comprising a suspension knuckle configured to be disposed within an inner fender of the vehicle; a brake shield configured to be mounted on the suspension knuckle; and an inner fender undercover coupled to the brake shield and configured to be disposed inboard of the wheel assembly. The inner fender undercover and brake shield are configured to turn with turning movement of the wheel assembly.

In another aspect, an inner fender undercover assembly comprises an undercover panel configured to be disposed inboard of a wheel assembly, the undercover panel being configured to move with movement of the wheel assembly; an undercover end plate connected to an outboard edge of the undercover panel; and an outer ring connected to the undercover end plate and configured to be disposed within a rim of the wheel assembly.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
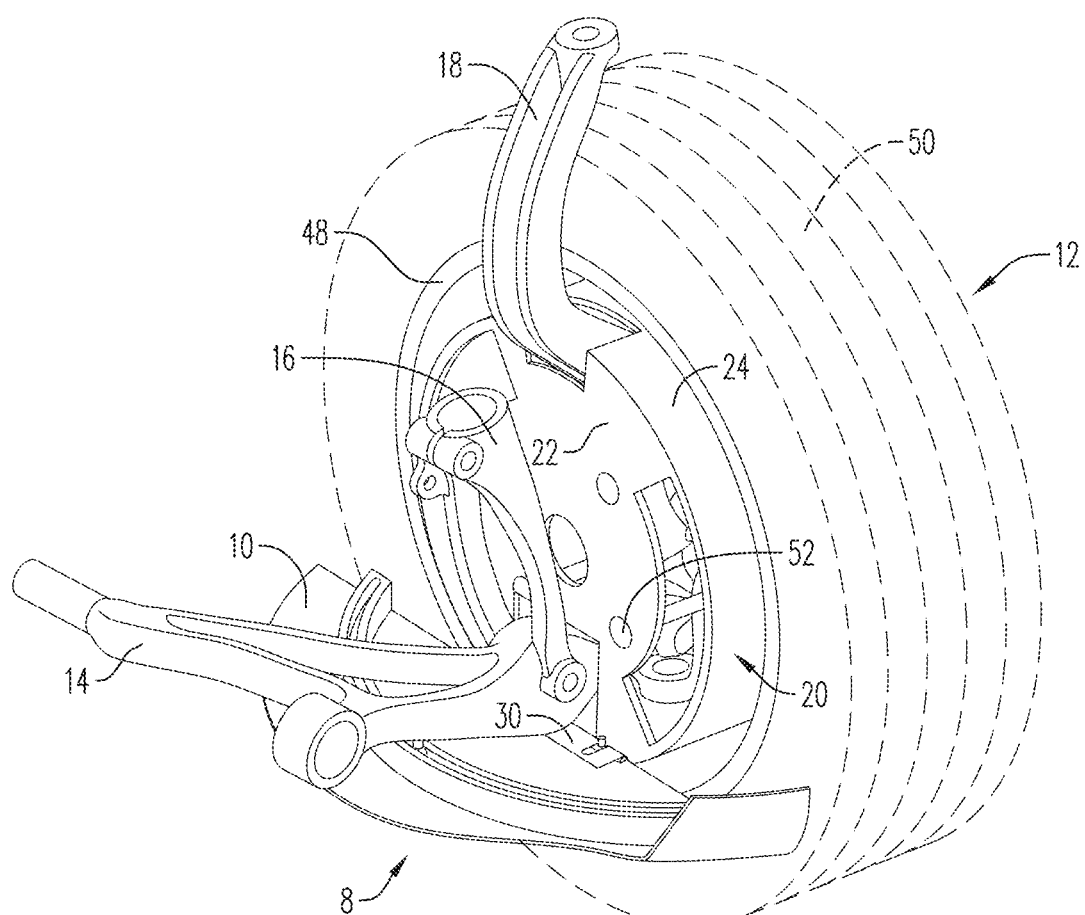
FIG. 1 is a perspective view of a disk inner fender undercover according to an exemplary embodiment of the disclosure.

The strong interaction between the airflow along the underbody of the vehicle and the wheel assembly and suspension components disposed within the wheelhouse area increases aerodynamic drag and exposes the suspension components within the wheelhouse area to damage from mud, rocks, gravel, snow, corrosive environments and the like, as encountered when the vehicle is being driven. In accordance with the disclosure herein, a disk undercover assembly is positioned inboard of the wheel and below the suspension components in the wheelhouse area. The disk undercover assembly effectively eliminates the large open area encountered by airflow along the underbody of the vehicle, and thus reduces aerodynamic drag while at the same time protecting the suspension components. In addition, the disk undercover assembly is configured to move with the movement of the suspension arm and the wheel assembly.

Referring to FIGS. 1-4, an exemplary embodiment of a disk undercover assembly according to the disclosure herein is shown generally by reference numeral 8. The undercover assembly 8 is configured to be mounted on a wheel assembly 12 of a vehicle, the wheel assembly including a tire 50 and a rim 48. The undercover assembly 8 includes an undercover panel 10, generally disposed between the suspension components of a vehicle and the road surface (not shown) on which the vehicle is being driven, an end plate or disk 22, and an outer ring 24 which protrudes into the wheel assembly 12 and covers an inner surface of the rim 48.

The suspension system of the vehicle includes suspension components such as the lower suspension arm 14, damper fork 16 and wheel suspension knuckle 18. The panel 10 has a guiding rail 34 that is configured to receive a lower appendage 36 of the suspension arm 14, as discussed further below, thus connecting the panel 10 and suspension arm 14. The end plate 22 is secured to the knuckle 18 by a plurality of fasteners 52 such as, for example, mounting bolts, screws, clips, or other types of fastening mechanisms. The end plate 22 further includes cut-out windows or openings 54, 56 that allow the suspension components 14, 18, respectively, to extend therethrough and have the necessary range of movement for vehicle operation. Hence, the undercover assembly 8 covers the inner fender or wheelhouse opening from underneath the vehicle in order to protect the vehicle components from impact by gravel, snow, rocks and other road debris, so as to reduce corrosion of the vehicle components. Further, the undercover assembly 8 blocks or impedes the flow of air from entering the inner fender area from below the vehicle and thus improves the overall aerodynamics of the vehicle.

Figure 5A:
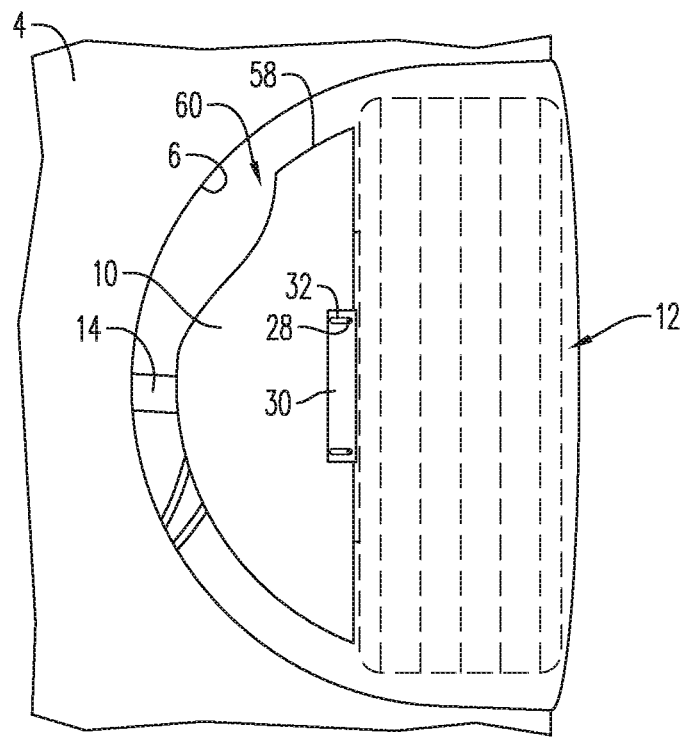
FIG. 5A is a bottom view of the disk inner fender undercover shown in FIG. 1 with the wheel straight and FIG. 5B is a bottom view of the disk inner fender undercover shown in FIG. 1 with the wheel turned.
Figure 5B:
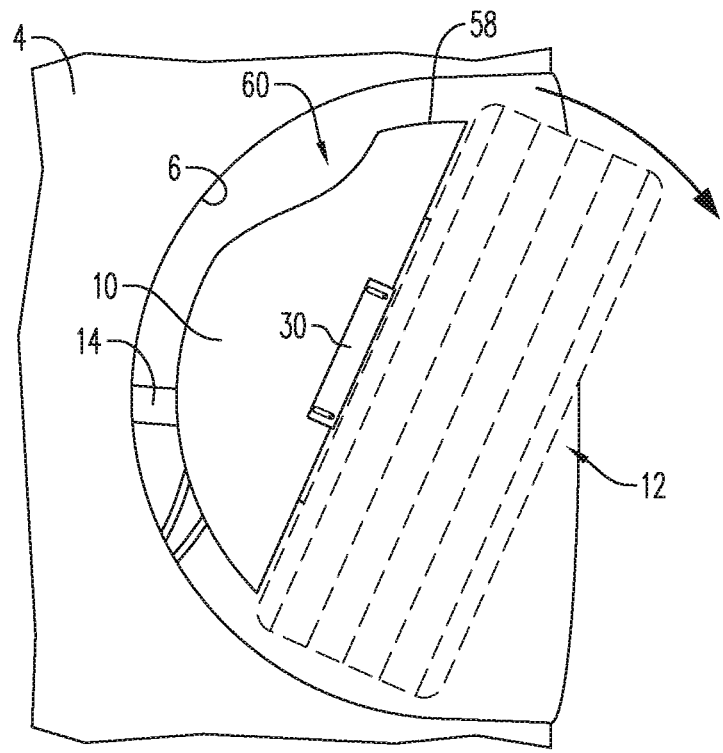

The disk or end plate 22 extends substantially perpendicular from the outboard edge of the undercover panel 10. The undercover panel 10 allows for wheel turning movements and up/down suspension movements. The undercover panel 10 can be formed from, by way of example, a flexible material, such as an elastomeric, rubber or felt material, or a rigid material such as a plastic (i.e., PVC), a sheet metal, or other rigid material, or it could also be formed as a combination of flexible and rigid materials, such as a felt material with sheet metal structural elements. Thus, the undercover panel 10 can generally be formed from any material capable of maintaining its structural shape integrity under high pressure from the air flow under the vehicle. The undercover panel 10 has a generally semi-circular shape corresponding to the overall shape of the inner fender panel 6 (see FIGS. 5A, 5B). The panel 10 thus covers the inner fender opening from underneath and leaves only a minimal radial gap with the vehicle underbody 4. The undercover panel 10 may also include a front end portion 58 having an increased vertical dimension defined by, for example, a large radius of curvature, in order to facilitate reattachment of air flow which has separated in the upstream gap between the inner fender and tire. The undercover panel 10 may also include a cutout or contour edge 60 in order to allow sufficient turning clearance of the front end portion 58 of the undercover panel 10 within the wheelhouse defined by the inner fender panel 6. The undercover panel 10 thus improves the aerodynamics of the vehicle and the wear resistance of the suspension components.

The undercover panel 10 is secured to the end plate 22 through the engagement of a first connection element 26 disposed on the outboard edge of the undercover panel 10 and a second connection element 30 disposed on the inboard side of the end plate 22 and extending perpendicular therefrom. More particularly, with reference to FIGS. 8A and 8B, the first connection element 26 defines a cylindrical portion along at least a portion of the length of the outboard edge of the panel 10, a semi-cylindrical portion being above the upper surface of the panel 10 and a lower semi-cylindrical portion being below the lower surface of the panel 10. Extending from the upper and lower semi-cylindrical portions of the first connection element 26 are projecting pins 28. While two pins 28 are illustrated on the upper portion of the first connection element 26 and two pins 28 are shown on the lower portion of the first connection element 26, one skilled in the art will appreciate that the number of pins can be modified based upon the particular vehicle construction. The second connection element 30 defines a generally U-shaped clip for engagement with the cylindrical portion of the first connection element 26 described above. The second connection element 30 also includes slotted openings 32 in the upper and lower legs of the U-shaped clip for receiving the projecting pins 28 therethrough on the first connection element 26.

During vehicle motion, the undercover panel 10 moves vertically up and down with movement of the suspension arm 14 and turns with turning movement of the wheel assembly 12. The brake shield 20, including the end plate 22 and ring 24, moves vertically up and down with the wheel assembly 12 and turns with turning movement of the wheel assembly. These movements are achieved through the combined features discussed below.

Figure 8A:
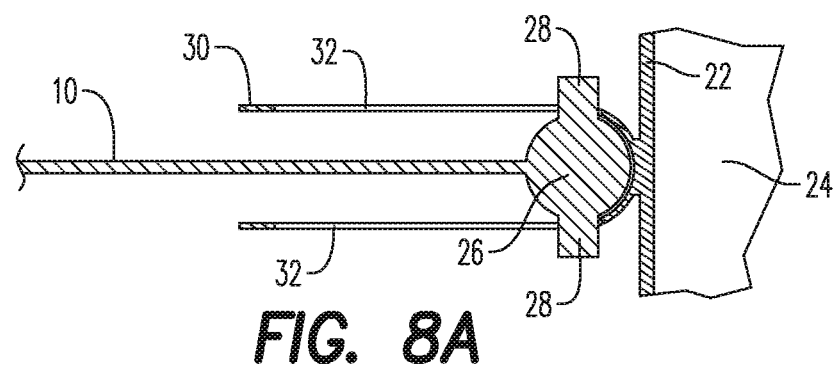
FIG. 8A is a cross section taken along line 8-8 in FIG. 3 when the wheel is in a first position and FIG. 8B is a cross section taken along line 8-8 in FIG. 3 when the wheel is in a second position.
Figure 8B:
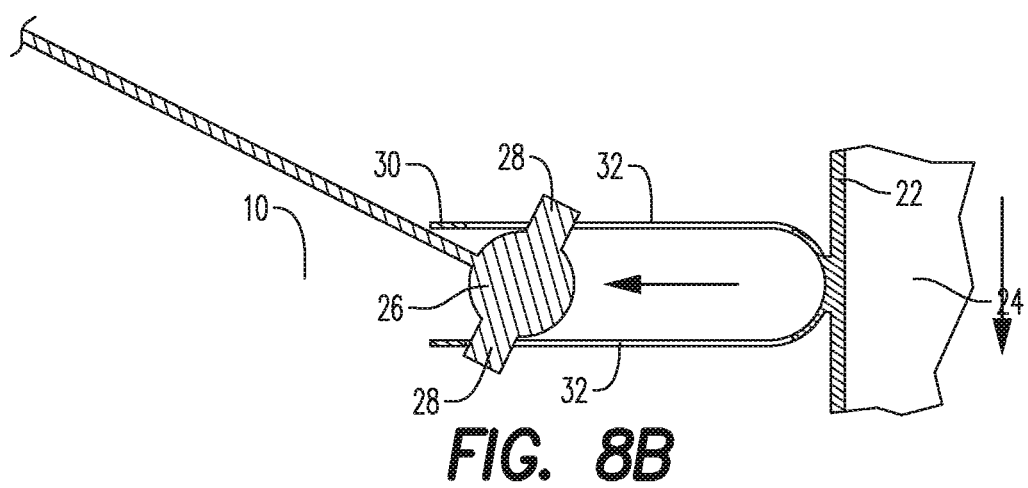

Referring to FIG. 8A, the U-shaped second connection element 30 clamps around the cylindrical shaped first connection element 26 and the projecting pins 28 extend through the slotted openings 32 in a first position proximal the outboard edge of the slotted openings 32. If the road surface is generally flat when the wheels are straight (FIG. 5A), or when the wheels are turned (FIG. 5B), undercover panel 10 maintains a substantially horizontal position that is generally parallel to the underbody 4 of the vehicle 2.

Figure 7A:
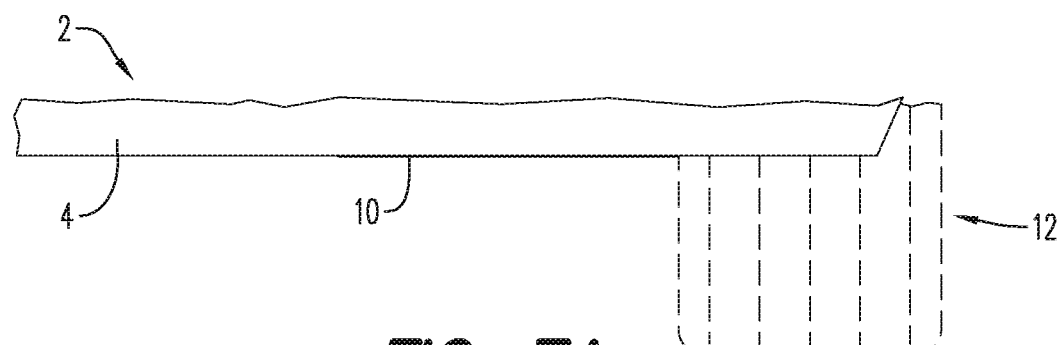
FIG. 7A is a front view of the disk inner fender undercover shown in FIG. 1 with the wheel in a normal suspension ride height and FIG. 7B is a front view of the disk inner fender undercover shown in FIG. 1 with the wheel in an increased suspension ride height.
Figure 7B:
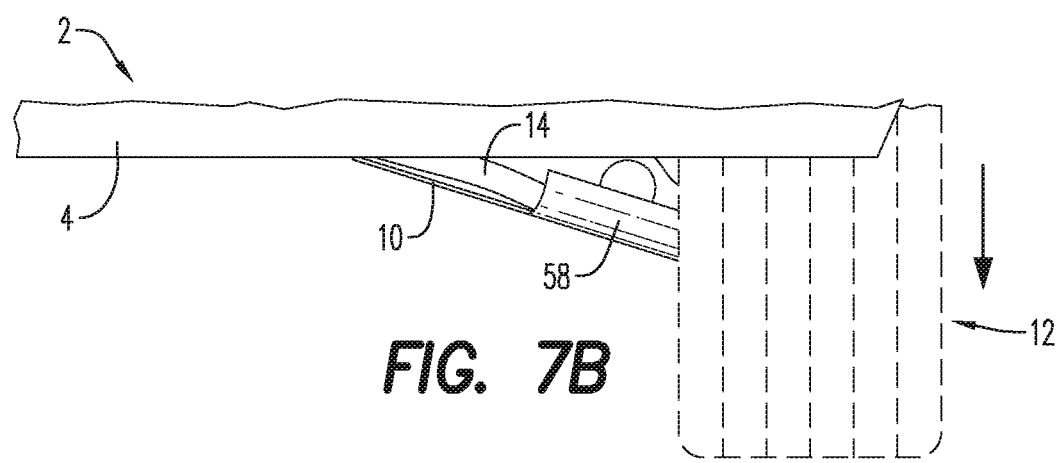

However, the suspension ride height of the vehicle 2 changes when the vehicle 2 encounters a change in road surface height, such as when driving over a speed bump. When this occurs, the undercover panel 10 moves vertically with the suspension arm 14 to accommodate the increased or changed suspension ride height through lateral movement of the first connection element 26 on the undercover panel 10 relative to the second connection element 30 on the end plate 22. More particularly, referring to FIGS. 7B and 8B, the projecting pins 28 extending through the slotted openings 32 allow lateral movement of the first connection element cylinder 26 relative to the second connection element clip 30 as restricted by movement of the pins 28 within the slots 32. As such, the first and second connection elements 26, 30 allow movement of the undercover panel 10 relative to the brake shield 20 (end plate 22) such that the undercover panel 10 is no longer generally parallel to the underbody 4 of the vehicle, as shown in FIG. 7B, and the position of the pins 28 within the slotted openings 32 has moved to a second position proximal the inboard edge of the slotted openings 32. The first and second connection elements 26, 30 thus permit the undercover panel 10 to move vertically up and down with movement of the suspension arm 14.

Figure 2:
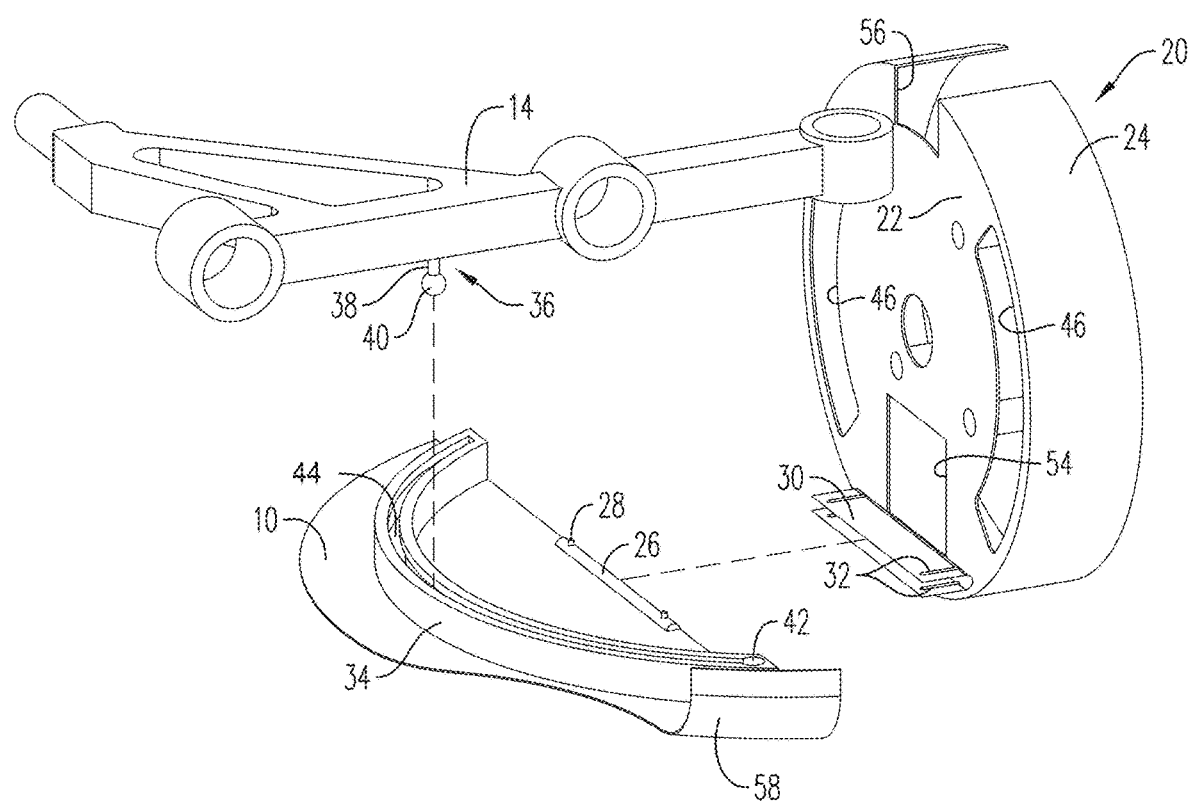
FIG. 2 is an exploded view of the disk inner fender undercover shown in FIG. 1.
Figure 3:
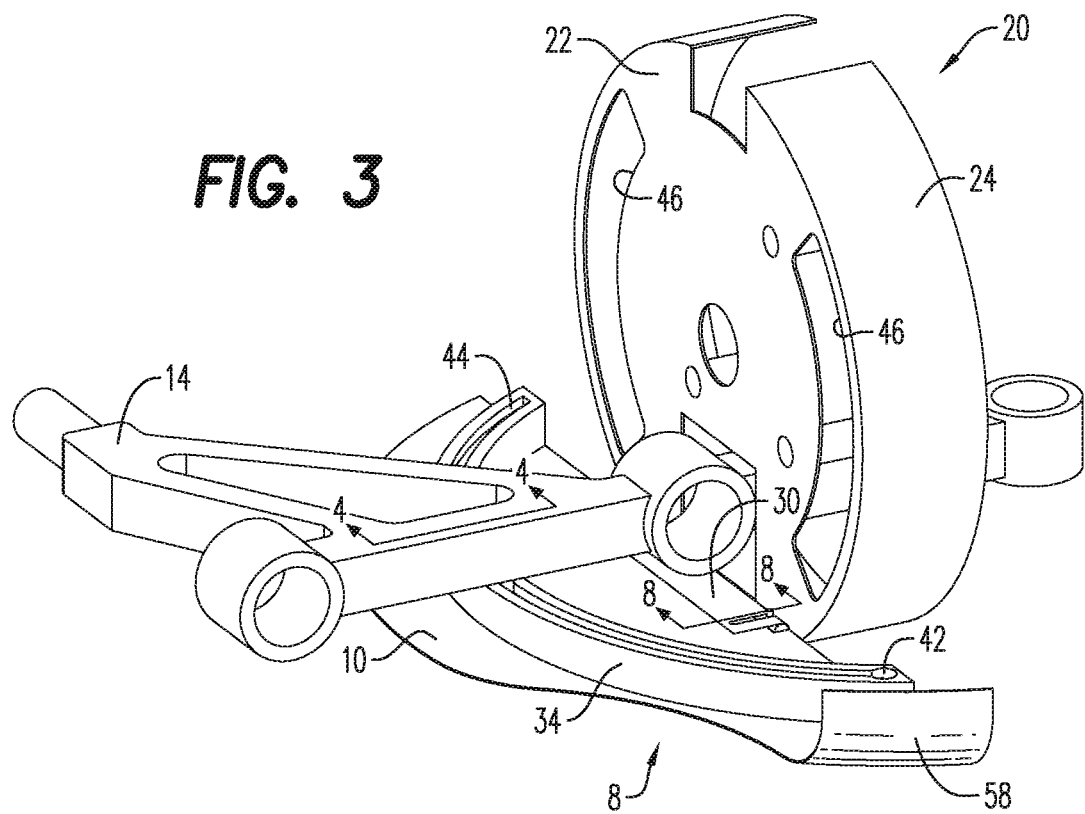
FIG. 3 is a further perspective view of the disk inner fender undercover shown in FIG. 1 with the wheel assembly and suspension components removed for clarity.
Figure 4:
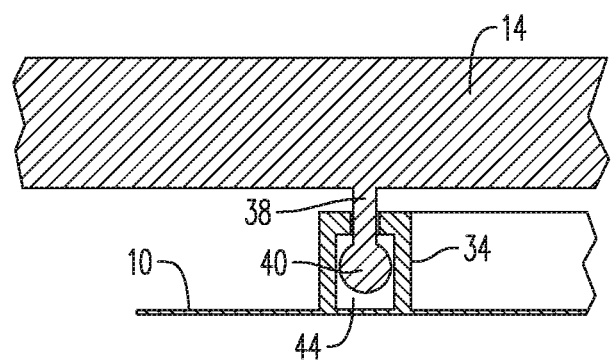
FIG. 4 is a cross-sectional view along line 4-4 shown in FIG. 3.

As shown in FIG. 2, the relative turning movement between the suspension arm 14 and the undercover panel 10 is governed by engagement of the lower appendage 36 on the suspension arm 14 with the guiding rail 34 on the undercover panel 10. More particularly, the lower appendage 36 on the suspension arm 14 projects vertically downward toward the undercover panel 10. The lower appendage 36 includes a post 38 and a lower engagement element or sphere 40. The guiding rail 34 defines a groove or guide channel 44 with an opening 42 formed on a terminal end thereof. In the exemplary embodiment of the disclosure, the lower engagement element is a sphere and the opening 42 is a round hole with a diameter slightly larger than the sphere. Thus, the lower sphere 40 enters the guide channel 44 through the opening 42 such that, with turning movement of the wheel assembly 12, the sphere 40 moves along the arcuate path defined by the guide channel 44. While the lower engagement element 40 is shown as having a spherical shape and the corresponding opening 42 is shown as a round hole in the exemplary embodiment described herein, one skilled in the art will appreciate that any shape could of course be used for the lower engagement element, such as, by way of example, a diamond, prism, cone, a non-regular shape, or the like, and the opening 42 will similarly have a shape corresponding to that of the lower engagement element. The larger opening 42 is disposed along the guide channel 44 outside of the turning range of the wheels such that normal steering movement of the wheels does not allow travel to a position that would align hole 42 with ball 40 and cause disengagement of the same. The assembly method of the disk undercover assembly 8 requires either attachment of post 38 separately, or alignment of ball 40 within slot 44 before attachment of connection elements 30, or removal of a tie rod, in order to allow a temporary over-travel of the hub for assembly purposes. The opening 42 could also be replaced with an opening at the end of guide channel 44 based on assembly preference.

Figure 6A:
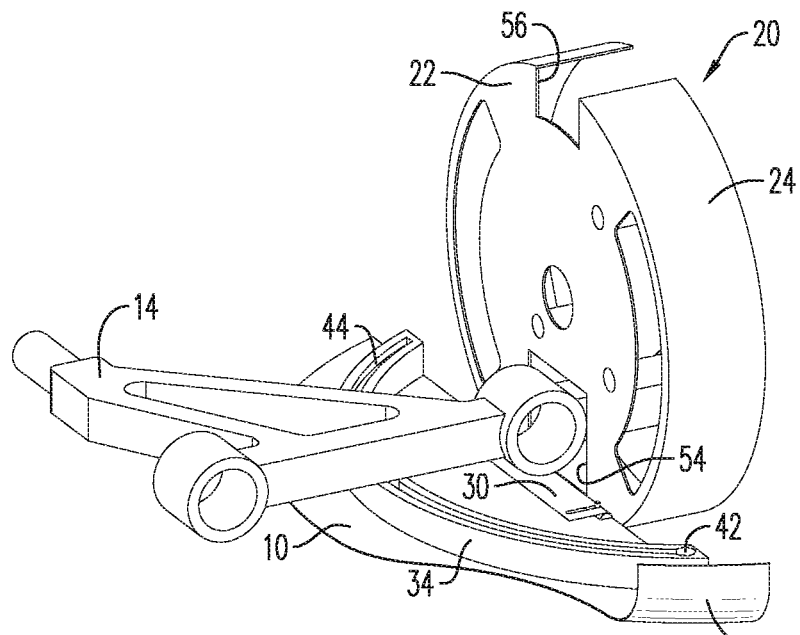
FIG. 6A is a perspective view of the disk inner fender undercover shown in FIG. 1 with the wheel straight and FIG. 6B is a perspective view of the disk inner fender undercover shown in FIG. 1 with the wheel turned.
Figure 6B:
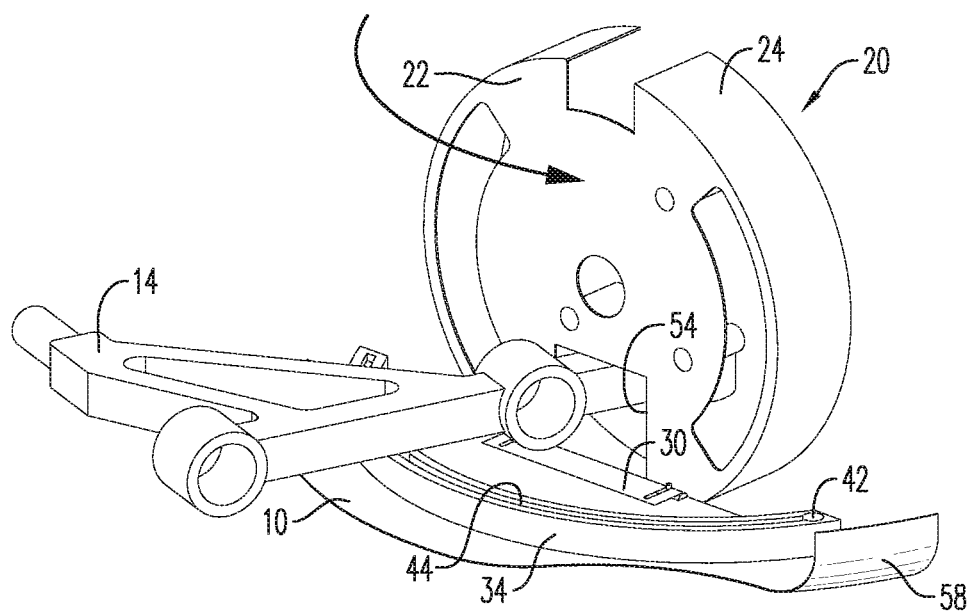

Referring also to FIGS. 6A and 6B, the relative turning movement of the suspension arm 14 relative to the undercover panel 10 is illustrated. When the wheel assembly 12 is straight, as shown in FIG. 6A, the suspension arm 14 is in a straight position relative to the undercover panel 10 with the lower sphere 40 being positioned in the guide channel 44 in a first position. However, when the wheel assembly 12 is turned, as shown in FIG. 6B, the undercover panel 10 turns with the wheel assembly 12 and thereby causes the lower sphere 40 to move within the guide channel 44 to a second position further toward the front or rear of the undercover panel 10. The sphere 40 can be positioned midway within the guide channel to define the first position, but if the turning angle is small, the first position of the sphere 40 can be positioned biased toward either the forward or the rearward side of the panel.

Thus, the combination of the first and second connection elements 26, 28 on the undercover assembly 8 together with the lower suspension arm appendage 36 engagement with the guiding rail 34 of the undercover panel 10 allows the necessary range of wheel movement while also fully protecting the suspension components from damage.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:
1. A vehicle comprising:
  a vehicle body having an underbody, the vehicle body defining an inner fender, the inner fender forming an opening in the underbody of the vehicle body;
  a wheel assembly having a rim and a tire, the wheel assembly being positioned within the inner fender;
  at least one suspension component disposed within the inner fender to permit motion of the wheel assembly relative to the vehicle body;
  a brake shield mounted on the suspension component; and
  an inner fender undercover panel secured on one of the brake shield and the at least one suspension component and disposed inboard of the wheel assembly;
  wherein the inner fender undercover panel includes an arcuate inboard edge coupled to the at least one suspension component; and
  wherein the inner fender undercover panel is configured to move up and down with vertical movement of the at least one suspension component and to turn with turning movement of the wheel assembly.

2. The vehicle according to claim 1, further comprising an outer ring configured to be disposed within a rim of the wheel assembly and an end plate connected to an outboard edge of the inner fender undercover panel, wherein the outer ring is connected to the end plate.

3. The vehicle according to claim 2, wherein the outboard edge of the inner fender undercover panel includes a first connection element including a plurality of projecting pins.

4. The vehicle according to claim 3, wherein the brake shield further includes a second connection element disposed on a lower inboard edge of the end plate, the second connection element including a plurality of slots configured to receive the plurality of projecting pins on the first connection element, wherein the first connection element and the second connection element are configured to be secured together and thereby connect the inner fender undercover panel and the end plate.

5. The vehicle according to claim 4, wherein the first connection element defines a cylindrical shaped enlargement on the outboard edge of the inner fender undercover panel and the second connection element defines a generally U-shaped clip, the U-shaped clip being fastened over the cylindrical shaped enlargement such that lateral movement of the inner fender undercover panel relative to the end plate is restricted by movement of the plurality of projecting pins within the plurality of slots.

6. The vehicle according to claim 1, wherein the inner fender undercover panel includes a guiding rail about a portion of a periphery of the inner fender undercover panel and the at least one suspension component includes a lower appendage configured for movement within the guiding rail.

7. The vehicle according to claim 6, wherein the lower appendage includes a depending post and a lower sphere, the guiding rail including an opening for receiving the lower sphere therewithin.

8. The vehicle according to claim 7, wherein the opening defines a diameter greater than a diameter of the lower sphere and the guiding rail defines a groove configured to retain the lower sphere within the groove as the lower appendage moves within the guiding rail.

9. The vehicle according to claim 1, wherein the arcuate inboard edge of the inner fender undercover panel defines a generally semi-circular edge corresponding to a curvature of the inner fender opening, the inner fender undercover panel including a front portion with an increased vertical dimension defined by a large radiused edge disposed along at least a portion of the semi-circular edge to facilitate reattachment of air flow.

10. An inner fender undercover assembly comprising:

an undercover panel configured to be disposed inboard of a wheel assembly, the undercover panel being configured to move with movement of the wheel assembly;

an undercover end plate connected to an outboard edge of the undercover panel; and an outer ring connected to the undercover end plate and configured to be disposed within a rim of the wheel assembly;

wherein the outboard edge of the undercover panel includes a first connection element including a plurality of projecting pins; and wherein the undercover end plate includes a second connection element disposed on a lower inboard edge of the end plate, the second connection element including a plurality of slots configured to receive the plurality of projecting pins on the first connection element, wherein the first connection element and the second connection element are configured to be secured together and thereby connect the undercover panel and the end plate.

11. The inner fender undercover assembly according to claim 10, wherein the first connection element defines a cylindrical shaped enlargement on the outboard edge of the undercover panel and the second connection element defines a generally U-shaped clip, the U-shaped clip being fastened over the cylindrical shaped enlargement such that lateral movement of the undercover panel relative to the end plate is restricted by movement of the plurality of projecting pins within the plurality of slots.

12. The inner fender undercover assembly according to claim 10, wherein the end plate includes at least one brake cooling opening.

13. A suspension assembly for a vehicle comprising:

a suspension component configured to be disposed within an inner fender of the vehicle, the suspension component configured to permit motion of a wheel assembly relative to the vehicle;

a brake shield configured to be mounted on the suspension component; and an inner fender undercover coupled to the brake shield and configured to be disposed inboard of the wheel assembly;

wherein the inner fender undercover and brake shield are configured to turn with turning movement of the wheel assembly.

14. The suspension assembly according to claim 13, wherein the inner fender undercover includes a guiding rail about a portion of a periphery of the inner fender undercover.

15. The suspension assembly according to claim 14, wherein the suspension component includes a projecting member configured for movement within the guiding rail.

16. The suspension assembly according to claim 15, wherein the projecting member includes a post and an engagement element, and the guiding rail includes an opening for receiving the engagement element therewithin.

17. The suspension assembly according to claim 16, wherein the opening defines a diameter greater than a diameter of the engagement element and the guiding rail defines a groove configured to retain the engagement element within the groove as the projecting member moves within the guiding rail.

18. The suspension assembly according to claim 17, wherein the inner fender undercover has a generally semi-circular edge corresponding to a curvature of the inner fender opening, a front portion of the inner fender undercover having an increased vertical dimension defined by a large radiused edge disposed along at least a portion of the semi-circular edge to facilitate reattachment of air flow.

* * * * *